Figure 1:
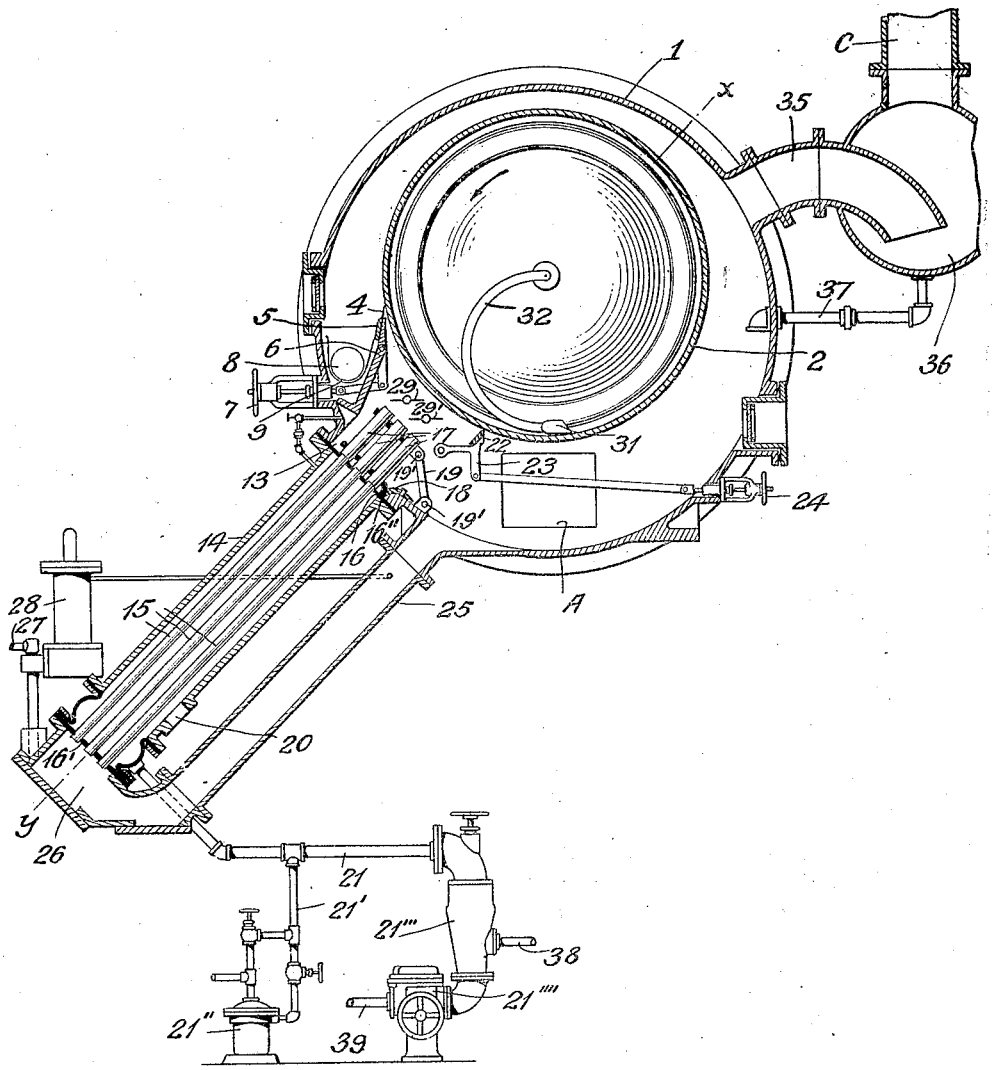

Aug. 31, 1926.

C. O. LAVETT 1,597,809

METHOD OF AND APPARATUS FOR DESICCATING LIQUIDS

Filed Oct. 6, 1921      2 Sheets-Sheet 1

Charles O. Lavett,
INVENTOR,
BY
His ATTORNEY.

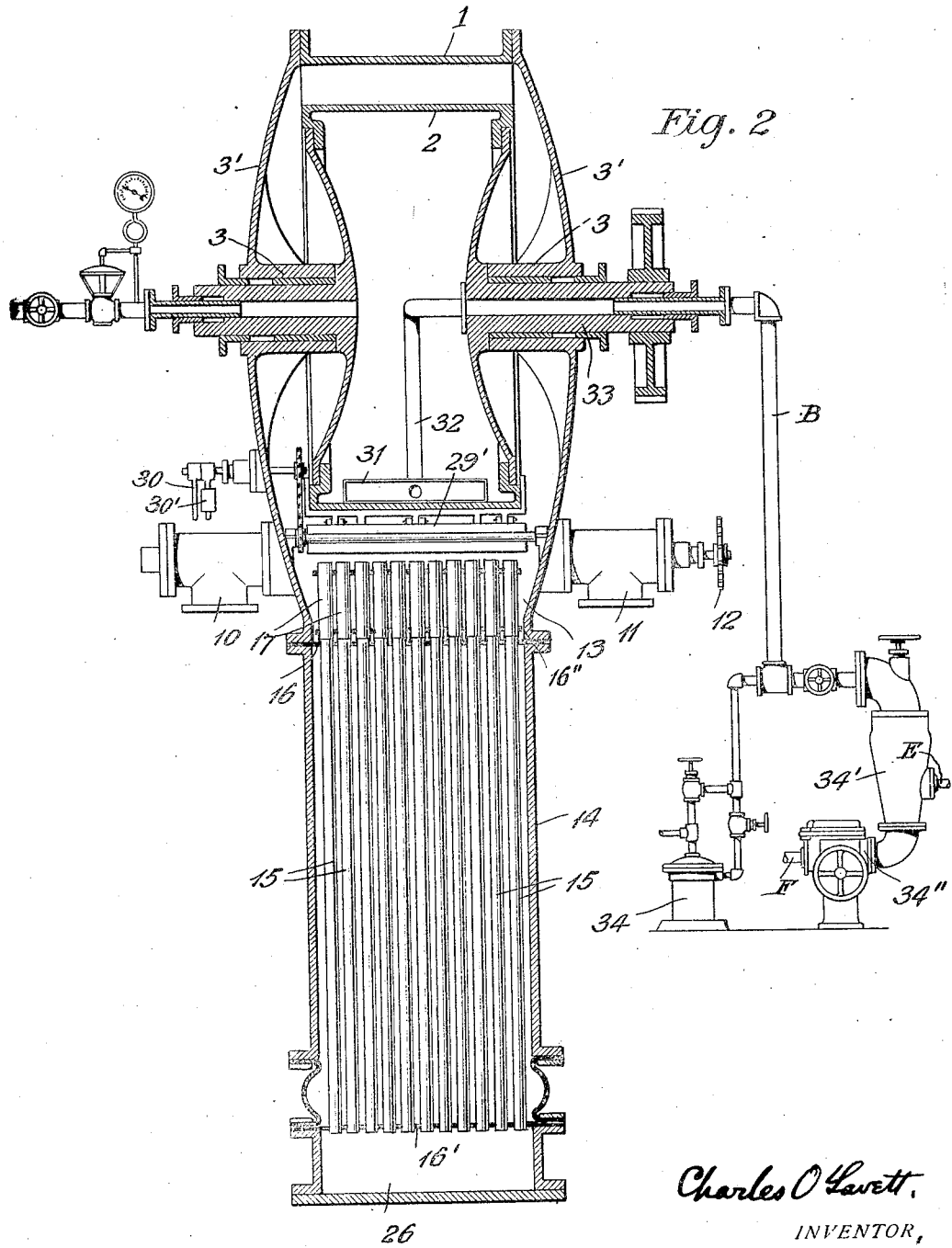

Patented Aug. 31, 1926.

1,597,809

UNITED STATES PATENT OFFICE.

CHARLES O. LAVETT, OF BUFFALO, NEW YORK, ASSIGNOR TO CHEMICAL & VACUUM MACHINERY CO. INC., OF BUFFALO, NEW YORK, A CORPORATION OF NEW YORK.

METHOD OF AND APPARATUS FOR DESICCATING LIQUIDS.

Application filed October 6, 1921. Serial No. 505,773.

This invention relates to the desiccation of the solid content of liquids and has for its principal objects not only the reduction in cost and size of the apparatus required for such purpose and the more economical and effective evaporation of the volatile constituents of the product being treated, but also the improvement in the quality of the desiccated product.

In order to desiccate the solid content of liquids, it is now recognized that it is more desirable as well as more economical to previously concentrate the liquid and then deliver the same to the evaporating surface, such for example as the drum dryer, in order that such liquids may be in as concentrated a form as is practical and thereby increase the capacity of the drying surface by carrying a heavier film and at the same time decrease to a minimum the time during which the materials are subjected to a relatively high temperature. Therefore it is customary in the case of liquids containing a low percentage of solids, such for example as lacteal liquids, various extracts etc., to first evaporate or concentrate such liquids to the desired density in an evaporating apparatus—this constitutes the first step—and then effect the transfer of the concentrate to the drying apparatus wherein the solids are reduced to a substantially dry state at the same or somewhat higher temperature as compared with the prior evaporating step—and this latter constitutes the second step of such process.

My investigations have led to the discovery that by combining, or what might be more properly termed intimately associating, the customary evaporation step with the final desiccation step, I am able to not only improve the product obtained, particularly when operating on albuminiferous liquids such for example as eggs, milk (whole and skimmed) buttermilk, maltedmilk and like lacteal liquids, but to effect economies in the process and in the equipment required which are very considerable. In fact one of the chief obstacles to the more general installation of vacuum drum dryers at creameries, which are usually located at milk collecting centers, has been the high cost of installing both an exaporating pan and a separate vacuum drum dryer of sufficient capacity to handle that portion of the creamery output which it was desired to desiccate.

While my invention is not confined solely to operations which require the employment of a vacuum in the drying apparatus, but is equally applicable for operations which are conducted at atmospheric or super-atmospheric pressure, nevertheless, I preferably employ vacuum drum dryers owing to the low production cost therein, as well as the excellence of the product which I am able to thereby produce and accordingly as a preferred example of my invention I have described a method and apparatus intended for operation under sub-atmospheric conditions.

My invention is fully set forth in detail in the following description and the accompanying drawings forming a part of this specification in which—

Fig. 1 is a vertical transverse section of an apparatus adapted to operate under sub-atmospheric conditions, which is suitable for carrying out my improved method as herein described and Fig. 2 is a longitudinal vertical section along the line $x$—$y$ of Fig. 1.

Referring to the drawings and the construction shown therein the reference numeral 1 designates the cylindrical outer casing of a drum dryer within which is mounted a hollow drum 2, the latter being journalled in suitable bearings in the respective heads of said casing 3, 3′ in a well known manner. A doctor blade or knife 4 mounted on a holder 5 is pivotally mounted on brackets 6, secured to and projecting inwardly from the said casing 1, the angle and tension of said doctor or knife being controlled externally by means of hand-wheels 7. A conveyor 8, which is positioned adjacent to the bottom of a trough 9, serves to conduct desiccated material, removed from said drum by the doctor or knife, through either conduits 10 or 11 that project through the respective casing heads. Preferably said conveyor is operated by means of a chain which engages with a sprocket wheel 12 or in any other suitable manner.

The casing 1 is provided with a relatively large aperture 13 to permit of the insertion therein of a casing 14, the latter constituting either a single effect evaporator or the last effect of a multiple effect evaporator or concentrator. The said concentrator includes a plurality of tubes 15, which are rigidly mounted in spaced relation to each other in said casing 14 and project through it heads 16, 16'. The tubes 15 are provided with removable continuation or extension tubes 17, held in place by stop 18 and rods 19, in such a manner that the same may be easily removed in sections and taken out for cleaning through opening A.

An intake or inlet 20 serves to admit steam to the chamber within said casing containing said tubes and a condensate outlet 21 permits the escape of the water of condensation from said casing through the by-pass 21', the steam trap 21'' or condenser 21''' and vacuum pump 21'''' as required. A supplemental doctor or blade 22, mounted on bell-crank levers 23, pivotally secured to casing heads 3, 3' and controlled externally by means of handwheels 24, serves to regulate the thickness of the coating carried up on said drum, as it rotates in the direction of the arrow, and any surplus removed by said latter doctor falls into the bottom of said drying chamber from which point it is conveyed by a downtake conduit 25, to the chamber 26 at the bottom of said evaporator and in communication with said tubes 15. A liquid inlet conduit 27 admits liquid to be dried to a liquid level control device 28, whence it passes to the said chamber 26 and then rises up within the tubes 15.

Adjustable deflectors 29, 29' are mounted directly in the path of the liquid and vapors which issue from said tubes 15, the same being mounted in suitable bearings on said casing heads 3, 3' and controlled externally by means of levers 30, 30'. These deflectors divert the course of the liquid and vapors that are projected from said evaporator in such a manner as to indirectly throw the same against the drum surface while at the same time the surplus liquid which does not adhere to said drum or which is deflected by the deflectors will drain into the bottom portion of the drying chamber adjacent to the aforesaid down-take tube.

An inlet or intake B, serves to admit steam to the drum. Within said drum and attached to the same is provided a scoop 31, which communicates through a pipe 32 with the hollow journal 33 of said drum and thereby permits the condensate to be discharged through steam trap 34 or condenser 34' and vacuum pump 34'' as required.

A vapor outlet 35 is in communication with a cylindrical separator 36 that is connected through the outlet C thereof to a condenser and vacuum pump as usual. Solids carried over with the vapors issuing from the drying chamber will be separated from the vapor by actual contact with the inner surface of the separator 36 by expansion and reduced velocity of the vapor due to the large increase of area of the separator. Liquid thus collected will be returned to said drying chamber through conduit 37.

The operation of the aforesaid apparatus, as is evident from the construction above described, is as follows:

Assuming for example that it is desired to produce desiccated skim milk, the casing 1 is first evacuated, the milk is then conveyed directly from the storage tank or supply through pipe 27 and the liquid level control 28 to the chamber 26 at the lower end of concentrator tubes and allowed to rise in said tubes 15 to about one third the height thereof. The drum is started in the direction of the arrow and steam of the desired pressure and temperature admitted through inlet B, the condensed steam formed being taken care of by pump 34'', after first passing through condenser 34'. The temperature of the heating medium inside of drum 2, is controlled by regulating the steam supply by means of suitable throttle and regulating valves and the speed of the pump 34'' as well as by the quantity of cooling water entering condenser 34'. Steam of the desired temperature and sufficient to effect the violent ebullition of the milk is then admitted to the steam chest around said tubes 15 and the condensed steam taken care of by trap 21' or vacuum pump 21''' as required. The milk, owing to ebullition thereof, will creep upwards higher and higher in said tubes, vaporizing part of its moisture in passing over the heating surface, rapidly increasing in velocity until projected from the upper end of said tubes and against the surface of the revolving drum 2. Preferably, as stated, the deflectors 29, 29' are employed so as to divert the vapors and liquid issuing from said tubes away from the drum until the desired concentration is attained, with the consequence that the liquid will work through the conduit 25 until such time as the angle of the deflectors is adjusted to permit of the concentrated liquid impinging directly against the surface of the drum. Any surplus liquid not clinging to the drum will immediately drop to the bottom of the drying chamber and find its way through the down-take conduit 25 to chamber 26 where it will again mix with the continuously incoming fresh milk to be concentrated. The concentrated milk which has been projected upon said drum will be carried upwardly in a film of regulated thickness in the direction indicated by the arrow and, prior to a complete revolution thereof, will be removed by the doctor or knife 4 in the substantially dry condition in the well known manner. The desiccated product will fall on to conveyor 8 from whence it is discharged from said casing through the conduits 10 and 11 into suitable receivers.

In certain instances, such for example as when drying viscous or sticky materials, a suitable disintegrator may if desired be interposed directly below the knife in order to break up the film as it drops on to the conveyer or a single receiver without the conveyer may be used.

For materials extremely sensitive to heat I provide small vacuum pumps 21″″″ and 34″ and condenser 21″ and 34′ for maintaining a partial vacuum inside of drum 2 and casing 14 respectively, thereby instantly reducing the temperature of the steam introduced to the temperature desired, by simply maintaining the proper vacuum. Where the temperature of steam at or above atmospheric pressure is too high, reduced steam pressure can be used advantageously and is superior and more efficient than using hot water as a heating medium and as a result very delicate materials can be dryed successfully and economically by this method. A small amount of cooling water enters condenser 34′, at E and is discharged with the steam condensate from the drum at F.

I have also provided a small vacuum pump 21″″″ and its associated condenser 21″″ for controlling the density of the concentrated solution by varying the temperature of the steam in steam chest or casing 14, the steam condensate passing through steam trap 21″ or pump 21″″″ as required. When using condenser 21″″, a small amount of water may be introduced at 38, which will be discharged with the condensed steam at 39.

The liquid in the evaporator tubes will inevitably be carried upward by the entrained vapors, since the latter, owing to their lighter specific gravity, will move faster than the liquid and will tend to crowd the liquid towards the inner walls of said tubes with the result that a film of the latter will creep or climb upwardly, while rapidly evaporating in transit, until they emerge together with the vapor at the upper end of said tubes from which, as stated, it will be projected upon said drum.

In those cases where a very dense dry product or a thick film is required, it is sometimes advantageous to deliver the liquid to the drum at a plurality of points in order to build up a coating of desired thickness on the drum surface and accordingly in such cases a series of concentrators may be arranged to project liquid at different points along the periphery of said drum.

It is apparent from the foregoing that as a result of my invention it is possible, as hereinbefore stated, to intimately associate, as continuous steps, the evaporation with the desiccation so that the same are virtually simultaneous and as a consequence, I am able to avoid the necessity for the separate storage of the milk after it has been concentrated and heated with the result that upon cooling the souring and the rapid growth of spores is retarded to an extraordinary degree.

Another advantage of the association of the concentrating and drying steps in the manner above described is the fact that by the forcible projection of the liquid against the drum surface any unfavorable influence due to the surface tension of the liquid is avoided and the production of a film upon the drum is accomplished much more effectively than in those cases where a body of milk is gradually caused to flow into contact with the drum or the drum is caused to move into contact with a body of liquid in the bottom of the drying chamber. This corresponds to the phenomenon of the disruption of liquid when projected from a distance on to a hot stove.

While I have described my invention I do not intend to limit the same to precise form as shown on the drawing and it is understood that the equipment can be used for separating liquids or fused products into two parts by evaporation, concentration, or distillation and furthermore that my invention is not limited to any particular product.

The diameter length and proper angle of tubes vary with different products. When permissible the concentrator 14 will extend through casing I to within the proper distance from drum 2 eliminating the necessity for extending the same, although from a sanitary standpoint this is advisable.

When desiccating milk under an external barometric pressure of 30″, it is desirable to maintain a vacuum in the drying chamber of 26″ to 28″. The heating medium which I preferably employ is live steam of an initial pressure of 10 to 30 lbs. and which is subjected in the drum to a vacuum corresponding to 1″ to 15″ but preferably 5″ of mercury. The speed of the drum is such that the film is exposed a maximum of about 30 to 60 seconds to the heating medium. When drying egg albumen the live steam aforesaid is subjected in the drum to a vacuum of between 10″ to 15″ whereas when drying pepsin it is desirable that the said live steam be subjected in the drum to a vacuum of 10″ to 12″.

The products produced by my improved process are in the form of powder, flakes or curly scales which are remarkably soluble and emulsifiable in water so as to be readily restored to a liquid closely approximating in color, flavor, appearance and properties the original liquid from which they were prepared. In the case of fresh milk, owing to the absence of exposure to heated air, the A, B and C vitamines are not destroyed but are present in the finished product.

My improved process is particularly suitable for the drying not only of milk but of blood-albumen, egg-albumen, pepsin and like materials which are sensitive to heat since such materials are rendered partially insoluble or non-emulsifiable if desiccated even in a vacuum by the employment of saturated steam or super-heated steam whereas by my process particularly when employing a vacuum of 0" to 20" within the drum and approximately 26" to 28" in the evaporating chamber, I am able by the employment of live steam to effect a rapid exchange of heat which results in the rapid condensation of the steam within the drum and its continuous replacement upon removal of the latter condensate by a fresh supply of steam.

When employing steam under reduced pressure, as above described, it is of course essential to maintain the partial vacuum in the steam space of the evaporator and also in the drum at reasonably constant pressures, and to accomplish this either a small wet (sic. liquid) vacuum pump to the steam outlet in order to effect the continuous removal of the condensate or if preferred such pump can be dispensed with and the equipment can be so located as to maintain a constant predetermined head of liquid condensate in a discharge pipe which has its lower end projecting into a tank or hot well. When the wet pump is employed, a small cold-water line is preferably connected directly to the pump section so as to inject a regulated quantity of vapor-condensing liquid thereinto and thereby a more perfect sealing of the pump valves will be effected by the small amount of vapor condensed, a higher vacuum can be maintained and a better circulation of the steam will be created.

While preferably the rods 19 are released by merely removing pins 19' so as to admit of the removal of the extension tubes 17 upon turning the stop plate 18 so that it is out of engagement with the suplemental head 16", nevertheless without departing from the spirit of my invention the evaporator tube may be continuous instead of sectional or other means may be provided for permitting of the ready cleaning thereof. The aforesaid construction, however, is extremely simple and convenient.

Having thus described my invention, what I claim and desire to secure by United States Letters Patent is:

1. A method of desiccating liquids which comprises the operation of inspissating the liquid to the desired consistency by heating the same while in a confined state so that the liquid will be projected from its confinement by the vapors generated therein during such confinement, and causing the inspissated liquid projected to be delivered directly against a moving heated surface and a part of the same to be dried thereon.

2. A method of desiccating liquids which comprises the operation of inspissating the liquid to the desired consistency by heating the same while in a confined state so that the liquid will be projected from its confinement by the vapors generated therein during such confinement, and causing the inspissated liquid projected to be delivered directly against a moving heated surface and a part of the same to be dried thereon without interrupting the flow of the same.

3. A method of desiccating liquids which comprises the operation of inspissating the liquid to the desired consistency by heating the same while in a confined state so that the liquid will be projected from its confinement by the vapors generated therein during such confinement, causing the inspissated liquid projected to be delivered directly against a moving heated surface and a part of the same to be dried thereon, and effecting a return of a portion of the evolved inspissated liquid and again subjecting the same to the effects of heat while under confinement.

4. An apparatus for desiccating liquids, comprising a main casing enveloping an evaporating chamber, means for maintaining a vacuum in said chamber, a rotatable drum mounted in said chamber, means for supplying a heating fluid to said drum, a concentrator, including a plurality of removable tubes, supported by said casing and arranged to discharge inspissated liquid into said chamber and directly against said drum, means for deflecting the inspissated liquid away from said drum and returning the same to the end of said tubes distant from said drum, and closure means for permitting of optional access to said casing to permit of cleaning thereof.

5. In an apparatus for desiccating liquids comprising a vacuum dryer having an enclosing casing adapted to be connected with an exhausting device and a rotary drum arranged within said casing and adapted to be heated internally, and an inspissator comprising a casing connected with that of said dryer and a plurality of tubes arranged within said last mentioned casing and adapted to receive the liquid to be desiccated and having their outlet ends arranged adjacent to the exterior of said drum and adapted to deliver the inspissated liquid directly upon said drum.

6. In an apparatus for desiccating liquids comprising a vacuum dryer having an enclosing casing adapted to be connected with an exhausting device and a rotary drum arranged within said casing and adapted to be heated internally, and an inspissator comprising a casing connected with that of said dryer and a plurality of tubes arranged within said last mentioned casing and adapted to receive the liquid to be desiccated and having their outlet ends arranged adjacent to the exterior of said drum and adapted to deliver the inspissated liquid directly upon said drum, the casing and tubes of said inspissator being arranged at an angle to the vertical.

Signed at Buffalo in the county of Erie and State of New York this 24th day of Sept., 1921.

CHARLES O. LAVETT.